(12) United States Patent
Broderick et al.

(10) Patent No.: US 8,815,197 B2
(45) Date of Patent: Aug. 26, 2014

(54) METHOD FOR UREA DECOMPOSITION AND AMMONIA FEED TO A SELECTIVE CATALYTIC REDUCTION SYSTEM

(71) Applicants: Jeffrey Michael Broderick, Ridgefield, CT (US); Scott H. Lindemann, Oxford, CT (US); James M. Valentine, Fairfield, CT (US)

(72) Inventors: Jeffrey Michael Broderick, Ridgefield, CT (US); Scott H. Lindemann, Oxford, CT (US); James M. Valentine, Fairfield, CT (US)

(73) Assignee: Peerless Mfg. Co., Dallas, TX (US)

( * ) Notice: Subject to any disclaimer, the term of this patent is extended or adjusted under 35 U.S.C. 154(b) by 0 days.

(21) Appl. No.: 14/047,737

(22) Filed: Oct. 7, 2013

(65) Prior Publication Data
US 2014/0099248 A1  Apr. 10, 2014

Related U.S. Application Data

(60) Provisional application No. 61/710,356, filed on Oct. 5, 2012.

(51) Int. Cl.
*B01D 53/56* (2006.01)

(52) U.S. Cl.
CPC .................................... *B01D 53/565* (2013.01)
USPC ...................................................... 423/239.1

(58) Field of Classification Search
USPC ...................................................... 423/239.1
See application file for complete search history.

(56) References Cited

U.S. PATENT DOCUMENTS

| 5,282,355 | A | 2/1994 | Yamaguchi |
| 5,296,206 | A | 3/1994 | Cho et al. |
| 5,809,774 | A | 9/1998 | Peter-Hoblyn et al. |
| 5,968,464 | A | 10/1999 | Peter-Hoblyn et al. |
| 6,203,770 | B1 | 3/2001 | Peter-Hoblyn et al. |
| 7,090,810 | B2 | 8/2006 | Sun et al. |
| 7,467,749 | B2 | 12/2008 | Tarabulski et al. |
| 7,615,200 | B2 | 11/2009 | Lin et al. |
| 7,815,881 | B2 | 10/2010 | Lin et al. |
| 7,829,033 | B2 | 11/2010 | Sun et al. |
| 8,470,277 | B2 * | 6/2013 | Sun et al. .................... 423/239.1 |
| 2004/0191709 | A1 | 9/2004 | Miller et al. |
| 2006/0115402 | A1 | 6/2006 | Sun et al. |
| 2006/0207243 | A1 | 9/2006 | Roberts et al. |
| 2008/0070177 | A1 | 3/2008 | Hansen et al. |
| 2009/0274601 | A1 | 11/2009 | Kwan et al. |
| 2010/0055014 | A1 | 3/2010 | Lin et al. |
| 2011/0133127 | A1 | 6/2011 | Kwan |
| 2011/0195007 | A1 | 8/2011 | Chung et al. |
| 2012/0177553 | A1 | 7/2012 | Lindemann et al. |

OTHER PUBLICATIONS

International Search Report and Written Opinion of the International Searching Authority Application No. PCT/US2013/063446 Completed: Jan. 30, 2014; Mailing Date: Feb. 7, 2014 11 pages.

* cited by examiner

*Primary Examiner* — Timothy Vanoy
(74) *Attorney, Agent, or Firm* — St. Onge Steward Johnston & Reens LLC

(57) ABSTRACT

A method of reducing NOx emissions from a lean burn combustion source employs an aqueous solution of reagent that is injected into a continuous decomposition duct at a rate of 0.2-10 gph with a flowing side stream of hot gas at a rate of 150-3000 scfm and a temperature of greater than 700° F. in the decomposition duct such that the aqueous reagent is converted to ammonia gas that is conveyed by the continuous decomposition duct to an ammonia injection grid that is placed in a primary exhaust stream from the combustion source upstream of a NOx reducing catalyst and NOx is reduced.

21 Claims, 3 Drawing Sheets

METHOD FOR UREA DECOMPOSITION AND AMMONIA FEED TO A SELECTIVE CATALYTIC REDUCTION SYSTEM

CROSS-REFERENCE TO RELATED APPLICATIONS

The present application claims the benefit under 35 U.S.C. §119(e) of the U.S. Provisional Patent Application Ser. No. 61/710,356, filed on Oct. 5, 2012.

FIELD OF THE INVENTION

The present invention relates generally to the reduction of nitrogen oxide (NOx) emissions from small industrial, commercial and electric utility boilers and other lean burn stationary combustion sources. More particularly, the present invention relates to a system and method in which urea is converted to ammonia for use in NOx reduction by selective catalytic reduction (SCR).

BACKGROUND OF THE INVENTION

The reduction of nitrogen oxide ("NOx") emissions from small industrial, commercial and electric utility boilers and other lean burn stationary combustion sources continues to be a challenge. Primary measures, such as low NOx burners, flue gas recirculation, fuel staging or air staging, need to balance the impact on the efficiency and stability of combustion with the level of NOx reduction obtained and the risk of increases in other regulated pollutants, such as carbon monoxide or unburned hydrocarbons. Secondary measures, including selective non catalytic reduction (SNCR) and selective catalytic reduction (SCR), involve the injection of reagents, such as ammonia or urea, into the upper furnace or the flue gases to chemically convert NOx to elemental nitrogen.

Ammonia reagent is regulated as a hazardous substance, which has driven many end users to consider aqueous urea reagent as an alternative. While aqueous urea is not a hazardous substance, its application for NOx reduction requires additional design effort to make certain that the urea is fully gasified and does not leave intermediate solid by products which can foul surfaces and reduce chemical utilization.

In converting urea to ammonia for use in NOx reduction by SCR, the art generally teaches the injection of urea into a heated vaporizer or a flowing side stream of hot combustion gases and/or heated air to gasify the urea for subsequent distribution upstream of a NOx reduction catalyst. Yamaguchi, in U.S. Pat. No. 5,282,355, describes the prior art as using NOx free exhaust extracted by an exhaust gas recirculation fan to vaporize aqueous ammonia in a vaporizer from which it is injected into the flue upstream of a catalyst layer via an ammonia vapor pipe. He identifies aqueous urea as a precursor to aqueous ammonia which can also be vaporized by NOx free exhaust. For aqueous based solutions of ammonia, Yamaguchi suggests that 0.5-1.0 seconds are required to vaporize the ammonia solution and Yamaguchi does not address the time required for complete decomposition and gasification of an aqueous solution of urea.

Yamaguchi identifies concerns about the formation and deposition of solids from the reaction of ammonia with other exhaust gas species and so proposes using superheated steam from the boiler or other source to provide the heat to vaporize the aqueous ammonia or its precursor in a vaporizer. However, the use of steam from a boiler has a penalty associated with removing steam from the heat or power generation process and also with the cost of preparing de mineralized boiler makeup water to replace the steam used in the vaporization of the aqueous ammonia or its precursor.

Peter-Hoblyn et al., in U.S. Pat. No. 5,809,774, describe the use of SCR for NOx reduction from lean burn engines in conjunction with fuel treatment using oil and water emulsions for a portion of the NOx reduction. Peter-Hoblyn et al. suggest that for SCR, especially at high loads, it is sometimes practical to introduce the aqueous solution of NOx reducing reagent into a slip stream (less than all, e.g., 5-25%) of the exhaust gases to achieve gasification of the reagent prior to mixing with the major or entire portion of exhaust gases.

In U.S. Pat. Nos. 5,968,464 and 6,203,770, Peter-Hoblyn et al, teach that the injection of aqueous urea into a pyrolysis chamber with droplets of under 500 micron, and preferably under 100 micron, will facilitate complete gasification of urea prior to introduction into the exhaust gases and allow close coupling of the pyrolysis chamber and SCR catalyst. The use of a return flow injector is proposed to cool the injector and prevent solids from plugging the injector. The pyrolysis chamber of Peter Hoblyn et al. is described in the specification and shown in the drawings as a small heated chamber with discrete holes disposed in the primary exhaust stream or as a foraminous structure that allows aqueous urea that has been gasified to ammonia in the chamber to escape into the flue gases and flow across a downstream SCR catalyst.

Peter-Hoblyn et al., however, do not describe how to prevent plugging of the compact pyrolysis chamber with urea decomposition products, especially at higher urea injection rates. Additionally, it is difficult to see how complete gasification of urea is accomplished in the pyrolysis chamber described by Peter-Hoblyn et al. While the process of Peter-Hoblyn et al. may work for low urea injection rates on the order of 10-25 grams/minute as required for passenger car diesel engines, it is not apparent how this approach would scale up for higher injection rates of 50-1000 grams/minute or greater, as often required for small stationary combustion sources.

Cho et al., in U.S. Pat. No. 5,296,206, describe the prior art as teaching the use of a flue gas slip stream drawn by a blower into a vaporizer vessel where the flue gas mixes and vaporizes aqueous ammonia, and also describes the use of an electric heater to heat ambient air and mix it with aqueous ammonia in a vessel, thus vaporizing the aqueous ammonia. Cho et al. identify both aqueous ammonia and urea as known reducing agents. Cho et al. propose using a heat exchanger in the flue gas to transfer heat to a heat transfer medium, such as ambient air, which is heated to 400° F.-950° F. and used to vaporize aqueous ammonia that is sprayed with an air assisted injector into a vaporizer vessel and from which vaporized reagent is then injected into the flue gas across a catalyst. Cho et al. avoid the need for external electricity or steam for vaporization but do not describe how the temperature in the vaporizer will be maintained at low loads and low flue gas temperatures across the heat exchanger, especially with the cooling effect of the aqueous reagent and atomizing air injected into the vaporizer.

In U.S. Pat. Nos. 7,615,200 and 7,815,881 directed at large scale combustors. Lin et al. teach that a side stream can be generated by bypassing some portion of flue gases around a heat exchanger surface, such as an economizer, into which aqueous urea can be injected and gasified prior to forming a combined stream across a catalyst. In U.S. Pat. No. 7,815,881, Lin et al. describe the bypass flow as less than 10% of the combustion gases. Obviously the overall combustor efficiency would be negatively affected if this large quantity of flue gas were bypassed around a heat exchanger. Lin et al. teach that at high loads with high temperatures the bypass damper can be closed; however, at low loads with low gas temperatures Lin et al. do not describe how this large quantity of bypassed gas would efficiently be brought up to a temperature sufficient for urea gasification.

Sun et al., in U.S. Pat. Nos. 7,090,810 and 7,829,033, describe a process for reducing NOx from a large-scale combustor involving a side stream of gases or heated ambient air into which urea is injected for decomposition and then introducing the side stream into a primary stream for NOx reduction across a catalyst. Sun et al, specifically teach that residence times of 1-10 seconds are required to effectively evaporate the water and gasify the urea such that solid byproducts do not foul the distribution pipes, ammonia injection grid ("AIG") or catalyst or heat transfer surfaces. Supplemental heat from a burner, steam coil heater or other source can be utilized. These patents are generally directed at large combustors and describe the need for sophisticated vessel design for the side stream using computational fluid dynamic ("CFD") modeling techniques.

Fuel Tech Inc. has commercially marketed a system called the ULTRA™ process which generally uses a burner to decompose large quantities of urea to ammonia for large-scale combustors and a related product called ULTRA-5™ for smaller applications which uses an electric heater to heat ambient air for urea conversion. In many applications, a burner requires an additional permit to operate. The use of ambient temperature atomizing air for the air atomized injector of the Fuel Tech processes can represent as much as 8% of the overall air through the decomposition chamber. That cooler air combined with the cooling effect of introducing aqueous urea into the decomposition chamber can result in an outlet temperature from the decomposition chamber that is under 600° F. and well below the minimum 650° F.-700° F. outlet temperature range which Applicants have found to be desirable. That can lead to incomplete decomposition of urea and/or to the need for the longer residence times as proposed by Sun et al.

The Sun et al. patents cited above, assigned to Fuel Tech Inc., generally teach 1-10 seconds residence time for complete gasification of urea before introduction into the bulk gas stream. However, Applicants have discovered that by balancing gas flow through the decomposition duct, temperature in the duct, urea injection rate and urea spray quality the residence time requirement for complete urea gasification can be reduced to under 1 second, which may be desirable in certain circumstances.

The marketplace has been looking for a simple, cost effective and reliable method of converting urea to ammonia on small combustion systems where only small quantities of aqueous reagent are required to be gasified. The prior art would lead one to believe that complex vaporizer systems, decomposition vessels designed with CFD, heat exchangers inserted in the flue gas, steam extraction from a boiler, high secondary power requirements to heat ambient air above the reagent decomposition temperature or large side stream ducts with bypass dampers and long residence times are required to reliably vaporize even small quantities of aqueous urea to generate ammonia gas for SCR.

To the contrary, however, the present invention provides a means and an apparatus that controls the rate of gas flow through the decomposition duct, maintains temperature in the duct, precisely controls the urea injection rate as a function of boiler load, targets and maintains urea spray quality without additional ambient atomizing aft and reduces the residence time requirement for evaporation and gasification to under 1 second while minimizing the need for external power.

SUMMARY OF THE INVENTION

More specifically, the present invention is directed to small combustion sources, such as those used in commercial and industrial boiler, furnace and combustion turbine applications generally rated at 10 million to 350 million BTU/hr heat input. It utilizes a blower or fan coupled to the boiler or combustor exhaust from which a slipstream of hot exhaust gas is extracted generally at 300° F.-750° F. and up to 950° F.

When the exhaust gas slipstream is above 750° F., cooling air, water injection or cooler downstream exhaust gas can be added to the slipstream to lower the gas temperature to the blower to less than 750° F. This reduces the cost of blower materials of construction and improves blower reliability.

A supplemental electric heater or burner is disposed in the slip stream portion of a duct following the blower and a temperature sensor is linked to the heater to maintain a gas temperature in the duct before the point of urea injection of at least 750° F. Preferably, the sensor is located after the point of injection and used to adjust the heater to maintain at least 650° F. after the injection point.

The slip stream portion of the continuous duct leads to an injection portion of the duct followed by a urea decomposition portion of the duct which is typically a simple expanded section of round duct of 4-12" diameter and up to 24-36" diameter depending on the quantity of reagent to be injected. The duct can be insulated to retain heat. A gas swirler can be positioned in the of the injection portion of the continuous duct prior to the urea injection point to create turbulence and mixing of the injected reagent in the gas stream. In another arrangement a smaller diameter slip stream portion of the duct is abruptly expanded into a larger diameter injection portion of the duct to create turbulence, high velocity and mixing past the point of aqueous urea injection.

An aqueous solution of 25-50% urea based reagent, or alternatively aqueous ammonia, is sprayed into the injection portion of the duct. In a preferred embodiment, a single fluid return flow injector producing an average droplet size of less than 60 microns is used to precisely control the reagent injection rate into the injection portion of the duct as a function of boiler load, exhaust gas flow rate or fuel feed rate which are correlated to uncontrolled boiler NOx emissions. Mapping with a hand held emissions monitor can be used to establish the NOx concentration in the exhaust gas versus combustor load, gas flow rate or fuel feed rate, or sensors can be used to monitor inlet and/or outlet NOx concentration and to adjust the urea injection rate to achieve the NOx reduction required.

The urea injection rate into the injection portion of the duct is programmed into a programmable logic controller (PLC) along with a boiler load signal, fuel flow rate, steam flow rate, exhaust gas flow rate, and/or NOx or ammonia slip signal to adjust the injection rate. The PLC controls the pulse width or on-time of the valve in the solenoid actuated injector which regulates the rate of urea injection.

A pumping skid with urea circulation pump, urea pressure sensor, urea filter and optional flow meters is used to circulate urea solution to and from the injector and is controlled by the PLC. A urea day tank with a solenoid valve, level sensor and optional transfer pump can be used to supply urea solution to the injection pump and be automatically controlled by the PLC to refill from bulk storage when the day tank level falls below a set point. Multiple injectors can be used on the injection duct depending on the urea injection quantity required and the level of redundancy desired.

Solenoid actuated return flow injectors of the kind described in U.S. Pat. No. 7,467,749 to Tarabulski et al. can be employed, as well as non-return flow solenoid valves, mechanical atomizers or air assisted injectors. It has surprisingly been found that small amounts of urea reagent such as that needed for small combustors can be easily gasified at temperatures of 750 F. and above measured upstream of the urea injection point with residence times of under 1 second if sufficient heated transport air and/or flue gas is available through the urea decomposition duct section to maintain an outlet temperature from the decomposition duct of at least 650° F. and preferably 700° F. and greater.

Transport air rates of 150 scfm to 1500 scfm and up to 3000 scfm are generally adequate for decomposition of 0.5-10 gallons/hr of 32% urea in under 1 second residence if the air or flue gas is heated to 750° F. or above prior to the decomposition chamber. Residence time for decomposition is measured from the point of aqueous urea injection in the injection portion of the duct to the point of gasified reagent injection into the primary gas stream upstream of the SCR catalyst.

The use of an exhaust gas slipstream as a transport medium helps reduce the cost of supplemental power for a heater or fuel for a burner, although ambient air or preheated air can also be used. An exhaust gas slipstream from a natural gas fired combustor is ideal in that it does not contain particulates from combustion. When solid fuels or heavy liquid fuels or waste gases are fired in a boiler or combustor it is preferred that the exhaust gas slipstream be filtered to reduce particulates through the decomposition duct and ammonia injection grid ("AIG").

Ammonia gas that is generated from the urea decomposition in the decomposition portion of the duct is ducted to an ammonia injection grid ("AIG") designed for good distribution of gasified reagent in the primary exhaust gas stream upstream of the SCR catalyst. AIG design is well known to those skilled in the art, and therefore is not set out in detail herein. Generally, however, the AIG can comprise, for example, simple vertical distribution pipes connected by a distribution header to the outlet of the urea decomposition portion of the duct and suspended from the top of a horizontal flowing primary exhaust duct or can comprise horizontal distribution pipes across a vertical flowing primary exhaust duct or other configurations of distribution pipes can be used. Each distribution pipe typically has multiple discharge orifices to achieve good ammonia distribution across the catalyst. A perforated plate or other flow conditioning devices can be installed prior to or downstream of the AIG.

Typical slip stream gas flow rates for good distribution through the AIG represent 0.2%-2% of the total exhaust gas flow, although the slip stream of hot carrier gases through the continuous duct can be as high as 10-50% of the total exhaust on combustion units with high baseline NOx levels requiring high reagent injection rates.

DETAILED DESCRIPTION OF THE INVENTION

Figure 1:
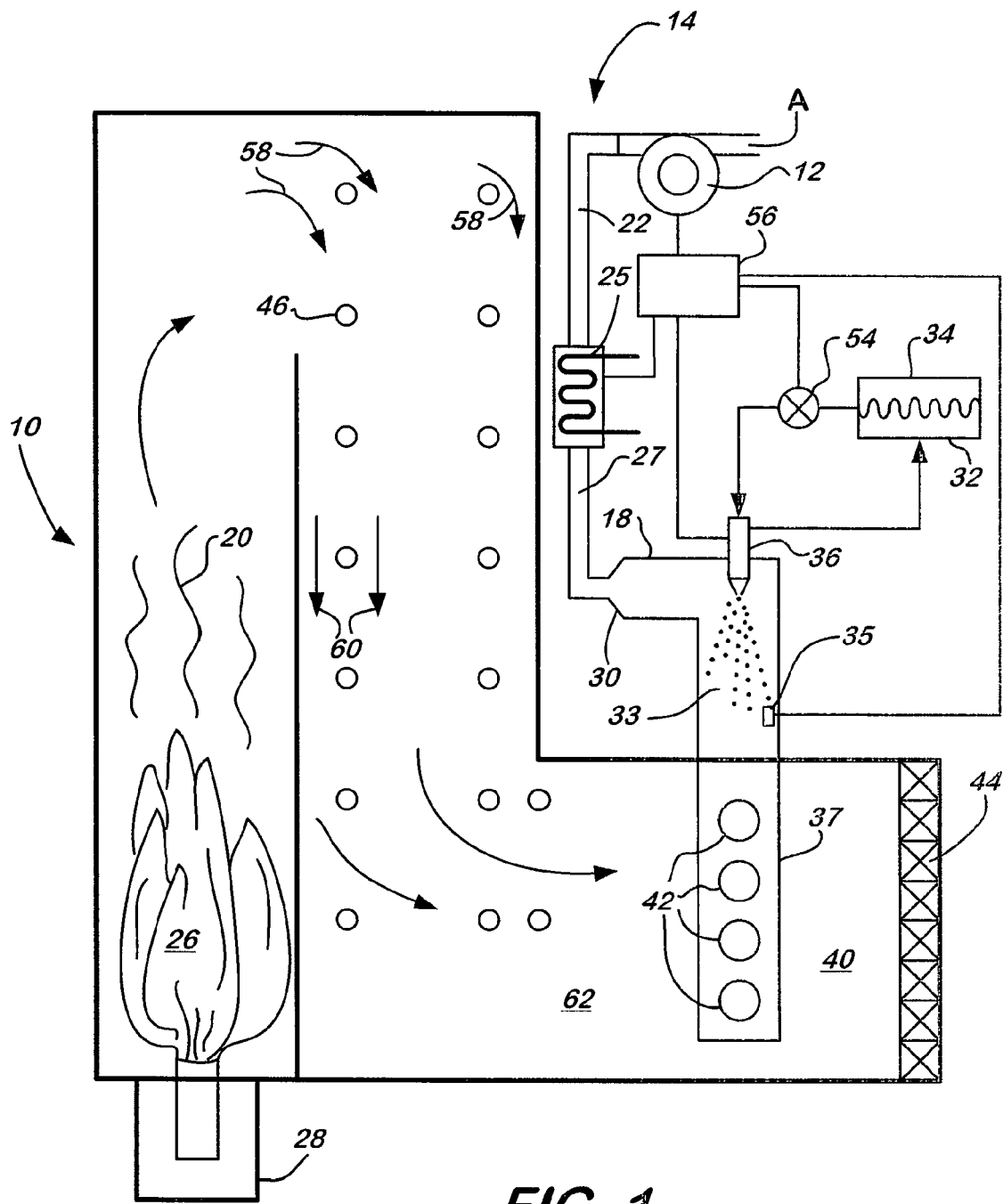
FIG. 1 is a schematic cross-sectional view of the present invention.

FIG. 1 illustrates a boiler configuration (10) wherein fuel and air are combusted by a burner (28) to form a flame (26) and hot combustion gases (20) which follow an exhaust path (58) past boiler tubes (46) where water through the tubes is converted to steam. Hot exhaust gases continue (60) and exit the boiler through an outlet transition (62). Ambient air (A) is drawn in through a fan (12) and ducted through a cold portion (22) of a continuous duct (14) to an electric heater (25) which heats the ambient air to a temperature of 700° F.-950° F.

The heated air exiting the electric heater then passes through the hot portion (27) of the continuous duct (14) and through a transition portion (30) of the continuous duct (14) into an injection portion (18) of the continuous duct (14). Injector (36) injects aqueous based urea reagent (32) stored in tank (34) into the injection portion (18) of the continuous duct (14) and flows with the hot carrier gas into the decomposition portion (33) of the continuous duct (14) where the water is evaporated and the reagent is decomposed to ammonia gas.

The decomposed and gasified reagent is then ducted to an ammonia injection grid (37) and introduced into the primary exhaust gas (40) through the AIG lances (42) located upstream of catalyst (44). The ammonia gas introduced into the exhaust reacts with NOx across the catalyst (44) resulting in a reduction in emissions of NOx.

Temperature sensor (35) is used by the controller (56) to control the heater (25) so that the gas temperature in the decomposition portion (33) of the continuous duct (14) after the point of reagent injection is above 600° F. and preferably above 650° F. (i.e., some cooling of the gas, which is supplied to the injection portion (18) of the continuous duct (14) at a temperature of at least 700° F., may take place due to the injection of the reagent).

Pump (54) circulates reagent to injector (36) from storage tank (34) which holds aqueous based reagent (32). Controller (56) controls the pump speed to maintain the pressure of the reagent delivered to the injector (36) and also controls the on time of the injector (36) to regulate the quantity of reagent injected as a function of one or more signals of the boiler load, fuel flow, inlet NOx, outlet NOx, gas flow or ammonia slip past the catalyst.

The decomposition portion (33) of the continuous duct (14) is sized to provide a residence time of less than 1 second and more typically between 0.2-0.6 seconds. Preferably, the continuous duct (14) has a circular cross section and the diameter of the injection portion (18) of the continuous duct (14) is between 0.2 and 2.5 times the diameter of the decomposition portion (33) of the continuous duct (14). In some cases the diameters of the injection portion (18) of the continuous duct (14) and the decomposition portion (33) of the continuous duct (14) are the same. It should be noted where the duct is not circular (for example square or rectangular) that the ratio between the injection portion (18) of the continuous duct (14) and the decomposition portion (33) of the continuous duct (14) can also be measured by the cross-sectional area of the ducts.

Figure 2:
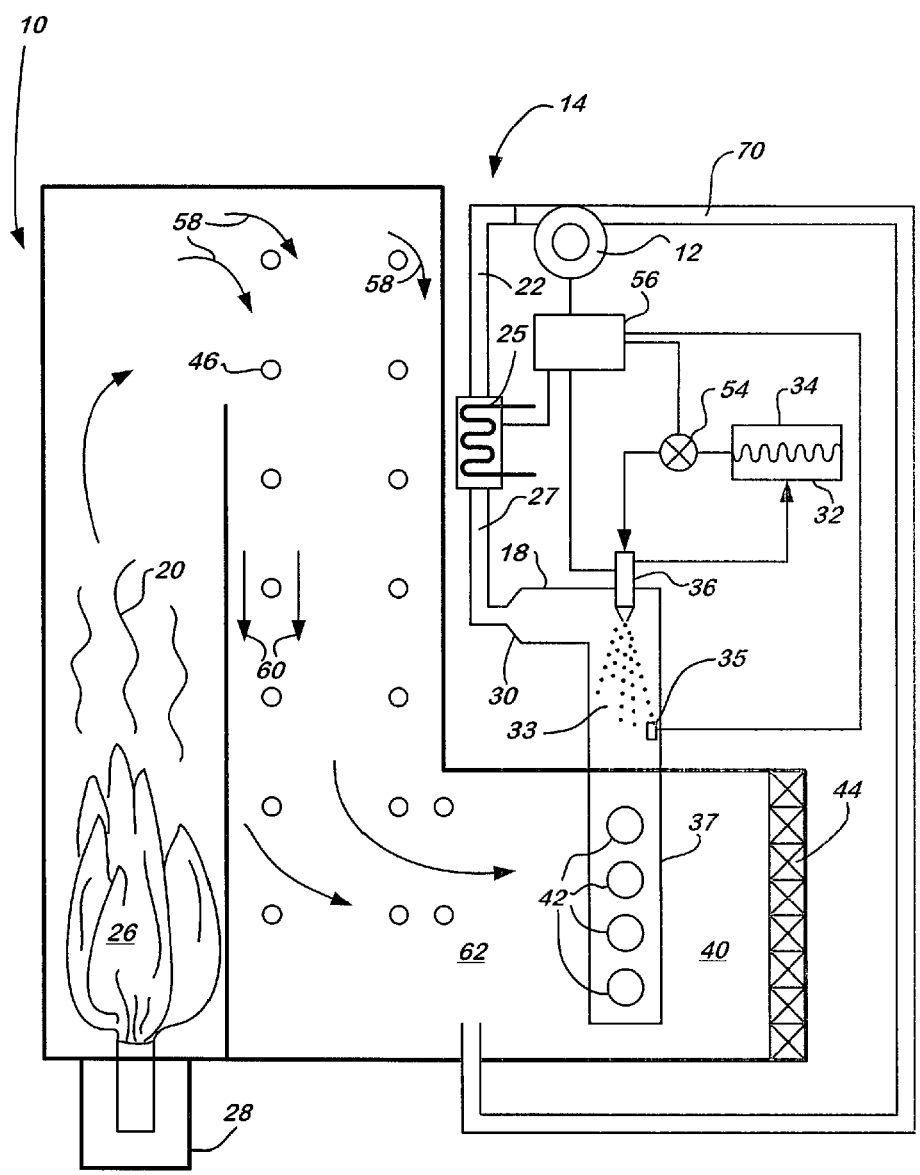
FIG. 2 is a schematic cross-sectional view of a first alternative embodiment of the present invention.

FIG. 2 shows an arrangement very similar to that shown in FIG. 1 and like reference characters are used to designate like elements. However, the main difference between the embodiment shown in FIG. 2 and that shown in FIG. 1 is that the ambient air to the fan (12) of FIG. 1 is replaced with a hot exhaust gas drawn off from the boiler exhaust via a conduit (70).

Preferably the exhaust gas temperature at the take off point is between 400° F. and 750° F. as it is delivered to the fan (12), and preferably, the exhaust gas is taken off from the boiler after the heat exchanger section thereof, such that no heat exchanger is bypassed. The electric heater (25) is then used, if necessary, to maintain a temperature of the gases supplied to the injection portion (18) of the continuous duct (14) of at least 700 F such that the temperature of the gas flowing in the decomposition portion (33) is at least 650° F. after injection of the reagent.

Figure 3:
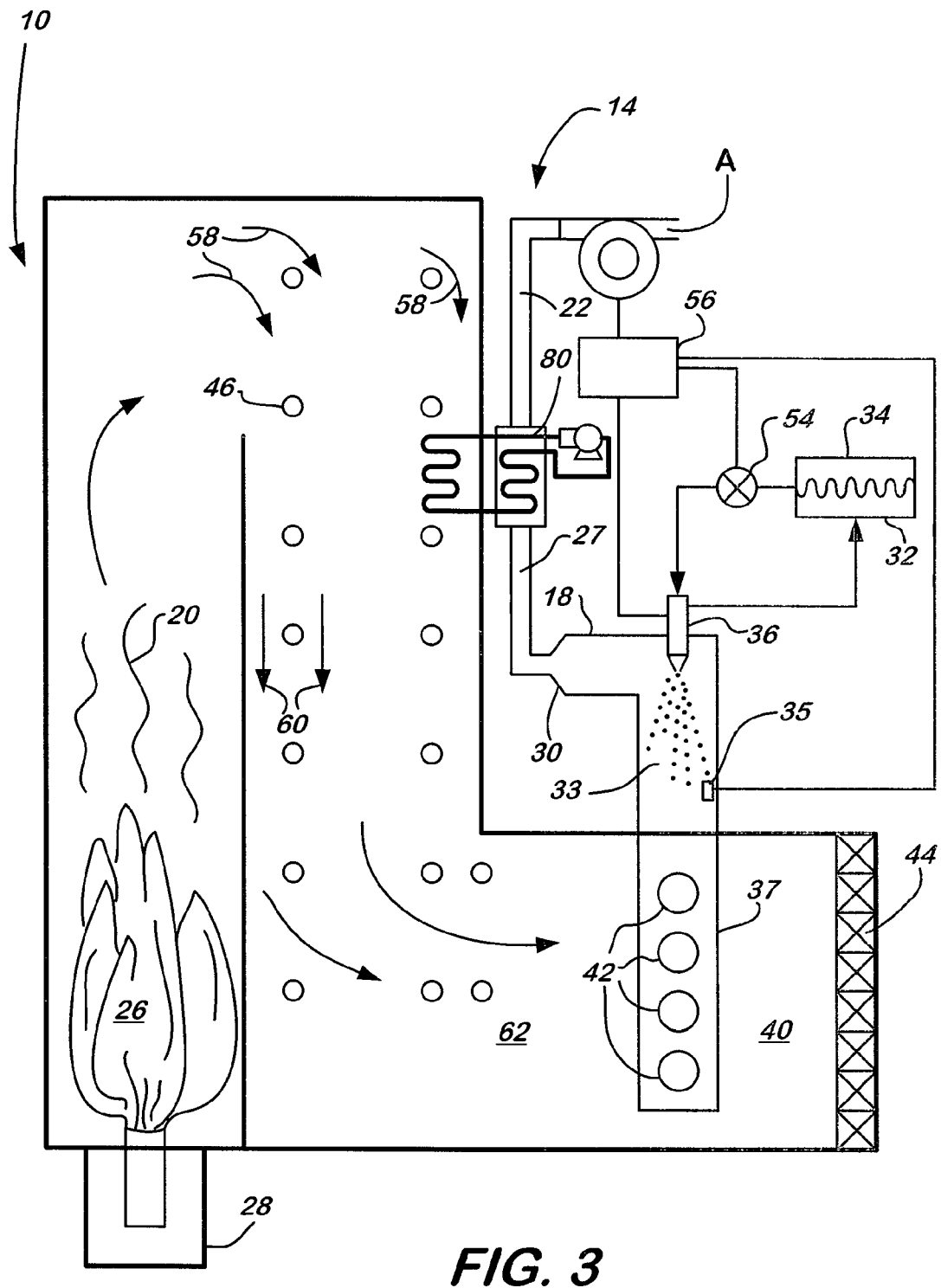
FIG. 3 is a schematic cross-sectional view of a second alternative embodiment of the present invention.

FIG. 3 again shows an arrangement very similar to that shown in FIG. 1 and like reference characters are used to designate like elements. However, the main difference between the embodiment shown in FIG. 3 and that shown in FIG. 1 is that electric heater (25) of FIG. 1 is replaced with a separate heat exchanger loop (80) inserted into the boiler exhaust gas flow at (58), (60) or (62) and used to heat the ambient air from fan (12) to a temperature of at least 700° F. as it enters the transition to injection portion (18) of the continuous duct (14). The heat exchanger (80) can be supplemented by a separate electric heater or burner.

Operation of the shown embodiments of the present invention is now illustrated through the following examples:

Example 1

A slipstream of exhaust gas from a lean burn combustion engine is directed to an injection portion of a continuous duct. The slipstream flow rate is 300 scfm at a temperature of 700° F. to 750° F. The exhaust gas in the primary exhaust and in the slipstream contains 1100 ppm of NOx. The slipstream is connected to an injection portion (18) and a decomposition portion (33) of a continuous duct (14) that is 5" in diameter. An aqueous solution of 32.5% urea is injected in the inlet end of the injection portion (18) of the continuous duct (14) using a solenoid actuated return flow injector as described in U.S. Pat. No. 7,467,749 to Tarabulski et al., the contents of which is hereby incorporated by reference herein. A computer based TRIM-NOX® injection system as commercially available through Combustion Components Associates Inc. with an injection pump, filter, day tank, pressure sensor and touch screen display is used to inject the aqueous reagent at a rate of 0.5 to 0.75 gallons/hr into the injection duct.

The injection portion (18) and the decomposition portion (33) form part of a continuous duct (14), the outlet of which is connected to an ammonia injection grid (AIG) (37). The AIG (37) includes two injection lances (42) that are connected to the outlet of the decomposition portion (33) of the continuous duct (14). The AIG lances (42) have multiple outlet ports to allow ammonia gas to escape from the lances. The AIG lances are fixed in the inlet of a SCR catalyst reactor, upstream of the catalyst (44), such that ammonia gas generated through the decomposition of urea in the decomposition portion (33) of the continuous duct (14) is injected from the lance outlet ports into the flowing stream of the primary exhaust flowing through the catalyst.

The catalyst (44) is of a commercial vanadium type formulation on a honeycomb support designed to reduce NOx in the presence of ammonia. When the injection system is operated the NOx out of the catalyst reactor is reduced from 1100 ppm to 100 ppm indicating the decomposition of the aqueous urea to ammonia gas through the decomposition duct is sufficient to reduce NOx in the primary exhaust gas as it passes through the catalyst.

Example 2

A fan is used to supply ambient air to a 60 Kw electric heater. The fan and heater deliver 300 scfm of air at a temperature of 700° F. to 750° F. to a 5" diameter continuous duct having an injection portion (18) and a decomposition portion (33). A 32.5% solution of aqueous urea reagent is injected into the injection portion (18) of the continuous duct (14) using a solenoid actuated return flow injector and system as described in Example 1.

The outlet of the decomposition portion (33) of the continuous duct (14) is connected to the AIG (37) and catalyst (44) arrangement as described in Example 1. The full exhaust flow from a lean burn combustion engine is passed through the catalyst reactor at a rate of 1100 scfm to 1200 scfm and a temperature of 750 F with a NOx concentration of 1100 ppm. Injection of 0.5 to 0.75 gph of aqueous solution into the injection portion (18) of the continuous duct (14) reduces the NOx out of the SCR reactor to 100 ppm indicating that the urea reagent has successfully been converted to ammonia gas which is successfully reducing NOx through the catalyst (44).

Although the invention has been described with reference to a particular arrangement of parts, features and the like, these are not intended to exhaust all possible arrangements or features, and indeed many modifications and variations will be ascertainable to those of skill in the art.

What is claimed is:

1. A method for reducing NOx emissions from a lean burn combustion source, said method comprising the steps of:
providing an injection grid in a primary exhaust duct of a lean burn combustion source upstream of a NOx reduction catalyst;
providing a continuous duct between a hot carrier gas supply and the injection grid, the continuous duct having an injection portion and a decomposition portion, the decomposition portion connected to the injection grid;
providing at least one injector in the injection portion;
passing hot carrier gas from the gas supply through the continuous duct at a rate of 150-3000 scfm, a temperature of the gas being greater than 700° F. in the injection portion of the continuous duct upstream of the at least one injector;
supplying an aqueous solution of urea from a storage chamber to the at least one injector at a rate of 0.2-10 gph;
injecting the urea solution into the hot carrier gas in the injection portion of the continuous duct such that the urea solution flows into the decomposition portion of the continuous duct for evaporation and decomposition into ammonia gas;
supplying the ammonia gas to the injection grid; and
injecting the ammonia gas into the exhaust duct.

2. The method of claim 1, wherein the urea has a residence time of less than 1 second measured from when the urea solution is injected into the injection portion of the continuous duct to when the ammonia gas is injected into the primary exhaust duct.

3. The method of claim 1, wherein the urea has a residence time of less than 0.6 seconds measured from when the urea solution is injected into the injection portion of the continuous duct to when the ammonia gas is injected into the primary exhaust duct.

4. The method of claim 1, wherein temperature of the gases is greater than 600° F. in the decomposition portion downstream of the at least one injector after the urea solution has been injected into the gases.

5. The method of claim 4, wherein temperature of the gases is greater than 650° F. in the decomposition portion downstream of the at least one injector after the urea solution has been injected into the gases.

6. The method of claim 1, wherein the gas supply comprises ambient air that is passed through a fan and heated to a temperature above 700° F. by a supplemental heater.

7. The method of claim 1, wherein the supplemental heater comprises an electric heater.

8. The method of claim 1, wherein the supplemental heater comprises a heat exchanger loop.

9. The method of claim 1 wherein the hot carrier gas supply comprises a portion of the primary exhaust gas from the combustion source at a temperature of greater than 700° F. that is passed through a fan before being passed through the injection portion of the continuous duct.

10. The method of claim 9 wherein the gases are taken from the combustor exhaust at a temperature of 400° F. to 650° F., passed through a fan and then through a supplemental heater to raise the temperature to above 700° F. before being passed through the injection portion of the continuous duct.

11. The method of claim 10 wherein the gases are taken from the combustor exhaust after the last heat exchanger section of the combustor.

12. The method of claim 10 wherein the gases are taken from the combustor exhaust after the catalyst but before the last heat exchanger section, passed through the continuous duct and reintroduced into the exhaust flow through the injection grid at a location upstream of the catalyst such that no heat exchanger surface is bypassed.

13. The method of claim 9 wherein the gases are taken from the combustor exhaust at a location before a heat exchanger surface, passed through the continuous duct and reintroduced into the primary combustor exhaust through the injection grid located downstream of the takeoff point but before the heat exchanger.

14. The method of claim 1 where the injection portion of the continuous duct is between 0.2 to 2.5 times the diameter of the decomposition portion of the continuous duct.

15. The method of claim 1 wherein the injector comprises an air assisted injector for improved atomization and cooling.

16. The method of claim 1 further comprising the step of providing a controller for regulating the rate of urea injection.

17. The method of claim 16 wherein the controller regulates the rate of urea injection as a function at least one of the following: boiler load, fuel flow, inlet NOx, outlet NOx, gas flow or ammonia slip past the catalyst.

18. The method of claim 1 further comprising the steps of:
sensing a temperature in the decomposition portion downstream of the at least one injector after the urea solution has been injected into the gases; and
regulating a temperature of the gases supplied to the injection portion upstream of the at least one injector based at least in part upon the sensed temperature.

19. A method of reducing NOx emissions from a lean burn combustion source wherein an aqueous solution of reagent is injected into an injection portion of a continuous duct at a rate of 0.2-10 gph with a flowing side stream of hot gas at a rate of 150-3000 scfm and a temperature of greater than 700° F. in an injection portion of the continuous duct such that the aqueous reagent is converted to ammonia gas that is conveyed by a decomposition portion of the continuous duct to an ammonia injection grid that is placed in a primary exhaust stream from the combustion source upstream of a NOx reducing catalyst and NOx is reduced across the catalyst.

20. The method of claim 19 wherein the aqueous solution of reagent comprises urea.

21. The method of claim 19 wherein the aqueous solution of reagent comprises ammonia.

* * * * *